UNITED STATES PATENT OFFICE.

EUGEN FISCHER, OF HÖCHST-ON-THE-MAIN, GERMANY, ASSIGNOR TO THE FARBWERKE, VORMALS MEISTER, LUCIUS & BRÜNING, OF SAME PLACE

PRODUCTION OF PARANITROBENZYLIDENE CHLORIDE.

SPECIFICATION forming part of Letters Patent No. 278,926, dated June 5, 1883.

Application filed January 23, 1883. (Specimens.)

*To all whom it may concern:*

Be it known that I, EUGEN FISCHER, a citizen of the Empire of Germany, residing at Höchst-on-the-Main, Germany, have invented certain new and useful Improvements in Coloring-Matter, of which the following is a specification.

My invention relates to the production of paranitrobenzylidene chloride, a material to be used in the manufacture of coloring-matters.

For carrying out my invention I proceed as follows: Pure and well-crystallizing paranitrotoluol is heated in an oil bath to a temperature of 266° Fahrenheit, (130° centigrade,) and while gradually raising the temperature to 320° Fahrenheit (160° centigrade) a current of chlorine gas is passed in until the calculated amount has been absorbed. The mass resulting from the reaction is washed with water, dilute carbonate-of-soda solution, and again with water, and finally it is crystallized from alcohol. If it be desired to convert this paranitrobenzylidene chloride into paranitrobenzaldehyde, it may be accomplished by treating the chloride with concentrated sulphuric acid, which converts it into paranitrobenzaldehyde at the same time that hydrochloric acid is evolved.

What I claim as new, and desire to secure by Letters Patent, is—

The new process of producing paranitrobenzylidene chloride, the same consisting in treating paranitrotoluol to the action of a current of chlorine gas at a high temperature, washing the resulting mass with water and then with a solution of sodium carbonate, and finally with water, treating the residue with alcohol, and crystallizing the product therefrom.

In testimony whereof I have affixed my signature in presence of two witnesses.

EUG. FISCHER.

Witnesses:
A. S. HOGUE,
J. GRUND.